Patented Jan. 25, 1944

2,339,928

UNITED STATES PATENT OFFICE 2,339,928

METHOD OF TREATING GLASS FIBERS AND ARTICLE MADE THEREBY

Harrison P. Hood, Corning, N. Y., assignor, by mesne assignments, to Owens-Corning Fiberglas Corporation, a corporation of Delaware No Drawing. Application November 4, 1938, Serial No. 238,895

6 Claims. (Cl. 106—50)

This invention relates to the production of glass fibers, also called glass wool, glass silk, spun glass, etc., and it relates particularly to glass textile fibers.

The primary object of the invention is to color such fibers, thereby increasing their usefulness for textiles.

Another object is to produce glass textile fibers having fast colors.

The above and other objects may be attained by practicing my invention, which embodies among its features melting a batch containing an easily reducible metal such as copper or lead, forming the molten mass into fibers and thereafter reheating the fibers in an atmosphere of reducing gas such as hydrogen or other reducing gas containing hydrogen.

Another feature of the invention is a glass fiber which contains within its mass a reduction product of a reducible metal oxide such as copper or lead oxide, whereby the fiber is colored and has a selective absorption for incident light.

Fiber glass is now being manufactured on a large scale for a variety of purposes, one of those contemplated being for use in textiles. For such use it is desirable to color the fibers in order to compete with other textiles. In such a stable material as fiber glass, it is highly desirable to use inorganic coloring means so as to avoid the color instability which is common to most organic dyes and coloring means. The range of colors which it is possible to produce with the usual coloring agents in glass masses is relatively limited and it is particularly limited in fiber glass because a color saturation so intense as to be almost opaque black in the glass mass is required to produce an appreciable color saturation in the fibers.

I have found that when the composition of the fibers includes or contains certain easily reducible metals, such as copper or lead, the fibers, though uncolored when fabricated, can be strongly colored by subsequently reheating them in an atmosphere of a reducing gas, preferably hydrogen or one containing hydrogen such as methane or natural gas. Glass fibers containing from ½% to about 10% of copper oxide may in this manner be colored with a variety of browns, reds and black, depending upon the temperature at which they are reduced and also upon their composition. Fibers containing from 4% to 50% of lead oxide will, on reduction as above, produce a variety of shades of gray and black.

I have found that the temperature and time of treatment is important in obtaining satisfactory results. In general, the higher the temperature the more dense or saturated the color will be, but too high temperatures cause the fibers to tend to stick together. A treatment for about one hour at temperatures from about 325° C. to 425° C. is satisfactory for most glasses. The high speed of travel of the fibers as they issue from the forming jets during their fabrication and the difficulty or impossibility of maintaining the proper temperature in the issuing fibers obviously would prevent the application of my process to fibers during their fabrication. Hence it is essential first to form the fibers in known manner and thereafter to reheat them reducingly as above.

The composition of the fibers is effective in determining the color or hue which will be obtained on reduction, particularly in copper containing glasses. Practically any glass containing at least 4% of lead will develop a black or gray color. A lead containing glass which contains also boric oxide will produce better results, that is, easier and more intense reduction, than one which contains no boric oxide. The presence of alumina in a lead containing glass has an inhibiting effect on the reduction.

Successful coloration of copper containing fibers depends upon the following considerations. Simple glasses of the soda-lime type do not of themselves produce satisfactory coloration with copper. However, I have found that when the composition contains boric oxide or alkali fluoride and/or arsenic or antimony a variety of colors may be obtained with copper. Borosilicates or glasses containing a substantial amount of boric oxide, say at least 5%, reduce at lower temperatures and produce colors more dense than non-borosilicates. If part of the alkali is replaced with alkali fluoride, more brilliant reds are obtained than otherwise is possible. The use of potash as the alkali also improves the quality of the red color with low copper content and with a copper content of 9% or more will produce a glossy black. Arsenic and antimony modify the color and in some compositions, as for example, in a lime glass containing copper and fluorine, will cause coloration which could not be produced in their absence. In a lead glass containing copper, the latter is effective in producing coloration. The following batches expressed in parts by weight will illustrate some of the compositions used and the results thereof:

| | I | II | III | IV | V | VI | VII | VIII | IX | X |
|---|---|---|---|---|---|---|---|---|---|---|
| Sand | 370 | 380 | 380 | 380 | 380 | 360 | 350 | 310 | 150 | 460. |
| Soda ash | 68 | 34 | 52 | | | 68 | 85 | 60 | | 24. |
| Boric acid | 160 | 106 | 106 | 106 | 106 | | 177. | | | |
| Cupric oxide | 10 | 10 | 10 | 10 | 10 | 10 | 40 | 15. | | |
| Sodium fluoride | | 40 | | 40 | | 40 | | 35. | | |
| Lithium carbonate | | | | | 49. | | | | | |
| Calcium hydrate | | | | | | 72. | | | | |
| Sodium silico-fluoride | | | 30 | | | 30. | | | | |
| Arsenic | | | | 15 | | 5 | | | | 1½. |
| Pearl ash | | | | | | | 88 | | | 170. |
| Saltpeter | | | | | | | 11 | | 60 | 25. |
| Nitre | | | | | | | | | | |
| Litharge | | | | | | | | 115 | 253 | 245. |
| Alumina hydrate | | | | | | | | 8. | | |
| Antimony oxide | | | | | | | | | 4.5. | |
| Borax | | | | | | | | | | 5. |
| Color of reduced fibers | Dark reddish brown. | Deep red. | Maroon. | Dark brown | Pink | Henna. | Black. | Dark henna. | Black. | Gray. |
| Temperature of reduction | 375° C | 375° C | 375° C | 375° C | 400° C | 375° C | 375° C | 375° C | 400° C | 400° C. |

The above compositions were melted and drawn into fibers of about .0003 inch diameter after which a quantity of fibers of each composition were heated in an atmosphere of hydrogen for one hour at the stated temperatures.

Compositions II and III show the effect of substituting alkali fluoride in composition I.

Composition IV shows the effect of adding arsenic.

Composition V demonstrates the effect of lithia.

Composition VI shows a soda lime glass in which color was developed by the introduction of a fluoride and arsenic. Without the arsenic this composition would have produced substantially no coloration.

Composition VII illustrates the effect of a high copper content in a potash borosilicate.

Composition VIII is a lead glass containing at the same time copper and fluorine.

Compositions IX and X illustrate the production of black and gray fibers respectively with lead glasses.

The effect produced by my process is not a surface metallizing effect, that is, a deposition of metal on the surface of the glass fibers, although it is certain that the lead or copper compounds in the glass are reduced. It is possible that this may not be a complete reduction to the metal. It is believed that the effect is analogous to the development of a ruby color in copper containing glasses of certain compositions melted with mild reducing agents and thereafter reheated or warmed-in to develop the color.

I claim:

1. A glass fiber containing a metal oxide selected from the group consisting of CuO and PbO and also containing as an essential ingredient throughout its mass a sufficient amount of a subsequently formed colloidal reduction product of the said metal oxide to color the fiber from red to black and formed by heating the fiber in a reducing atmosphere at a temperature not exceeding about 400° C.

2. A glass fiber containing at least 5% of $B_2O_3$ and also containing as an essential ingredient throughout its mass a sufficient amount of a subsequently formed colloidal reduction product of CuO to color the fiber from red to black and formed by heating the fiber in a reducing atmosphere at a temperature not exceeding about 400° C.

3. A glass fiber containing at least 5% of $B_2O_3$ and an alkali metal fluoride, and also containing as an essential ingredient throughout its mass a sufficient amount of a subsequently formed colloidal reduction product of CuO to color the fiber from red to black and formed by heating the fiber in a reducing atmosphere at a temperature not exceeding about 400° C.

4. A glass fiber containing an alkali metal fluoride, and also containing as an essential ingredient throughout its mass a sufficient amount of a subsequently formed colloidal reduction product of CuO to color the fiber from red to black and formed by heating the fiber in a reducing atmosphere at a temperature not exceeding about 400° C.

5. A glass fiber containing at least 5% of $B_2O_3$, and containing arsenic, and also containing as an essential ingredient throughout its mass a sufficient amount of a subsequently formed colloidal reduction product of CuO to color the fiber from red to black and formed by heating the fiber in a reducing atmosphere at a temperature not exceeding about 400° C.

6. A glass fiber which contains in its composition at least 4% of lead calculated as PbO at least part of said lead being distributed throughout the mass of the fiber as a subsequently formed reduction product of PbO to color the fiber from grey to black and formed by heating the fiber in a reducing atmosphere at a temperature not exceeding about 400° C.

HARRISON P. HOOD.